United States Patent
Hagiwara (10) Patent No.: US 9,482,776 B2
(45) Date of Patent: Nov. 1, 2016

(54) INTERFEROMETRIC PROCESSING TO DETECT SUBTERRANEAN GEOLOGICAL BOUNDARIES

(71) Applicant: ARAMCO Services Company, Houston, TX (US)

(72) Inventor: Teruhiko Hagiwara, Houston, TX (US)

(73) Assignee: Aramco Services Company, Houston, TX (US)

( * ) Notice: Subject to any disclaimer, the term of this patent is extended or adjusted under 35 U.S.C. 154(b) by 478 days.

(21) Appl. No.: 13/762,040

(22) Filed: Feb. 7, 2013

(65) Prior Publication Data

US 2014/0216818 A1  Aug. 7, 2014

(51) Int. Cl.
*E21B 47/00* (2012.01)
*G01V 3/26* (2006.01)
*E21B 7/04* (2006.01)
*E21B 47/022* (2012.01)
*G01V 3/10* (2006.01)
*G01V 3/28* (2006.01)

(52) U.S. Cl.
CPC . *G01V 3/26* (2013.01); *E21B 7/04* (2013.01); *E21B 47/02216* (2013.01); *G01V 3/10* (2013.01); *G01V 3/28* (2013.01)

(58) Field of Classification Search
USPC ............ 166/40; 324/333, 338–341, 354–359
See application file for complete search history.

(56) References Cited

U.S. PATENT DOCUMENTS

| | | | |
|---|---|---|---|
| 4,529,938 A | 7/1985 | Hagiwara | |
| 6,181,138 B1 | 1/2001 | Hagiwara et al. | |
| 6,211,678 B1 * | 4/2001 | Hagiwara | G01V 3/30 324/338 |
| 6,216,090 B1 | 4/2001 | Hagiwara | |
| 2010/0176812 A1 | 7/2010 | Bittar et al. | |
| 2011/0133740 A1 | 6/2011 | Seydoux et al. | |
| 2011/0254552 A1 * | 10/2011 | Wu | G01V 3/28 324/339 |
| 2012/0026314 A1 * | 2/2012 | Zhdanov | E21B 47/0002 348/85 |

OTHER PUBLICATIONS

PCT the International Search Report and the Written Opinion of the International Searching Authority dated Sep. 11, 2014; International Application No. PCT/US2014/015298; International File Date: Feb. 7, 2014.
Helgesen, T.B., et al., Reservoir Navigation With an Extra-Deep Resistivity LWD Services, Jun. 26-29, 2005, pp. 1-13, Society of Petrophysicists and Well Log Analysts (SPWLA), SPWLA 46th Annual Logging Symposium, New Orleans, Louisiana.

* cited by examiner

*Primary Examiner* — Taras P Bemko
(74) *Attorney, Agent, or Firm* — Bracewell LLP; Constance G. Rhebergen; Keith R. Derrington (57) ABSTRACT

A method of identifying a bed boundary in a subterranean formation by processing data measured by an induction logging tool. An interferometric method compares recorded voltages and/or phases recorded at axially spaced apart receivers on the logging tool. A transmitter is on the logging tool and set between the receivers, where the receivers are equally spaced apart from the transmitter. The transmitter emits a signal having frequencies up to around 50 kHz.

19 Claims, 11 Drawing Sheets

INTERFEROMETRIC PROCESSING TO DETECT SUBTERRANEAN GEOLOGICAL BOUNDARIES

BACKGROUND

1. Field of Invention

The present disclosure relates in general to a method of detecting subterranean bed boundaries using interferometric processing. More specifically, the present disclosure relates to interferometric processing of low frequency resistivity log data to locate a subterranean bed boundary during earth boring procedures.

2. Description of Prior Art

A resistivity measurement is one typical subterranean formation evaluation procedure where a log of the resistivity adjacent a wellbore is measured. Formation resistivity is a function of any fluids trapped within the subterranean formation. Thus resistivity is often measured to identify where water and/or hydrocarbon are present in the formation. Changes in resistivity in a subterranean formation can be abrupt and define a bed boundary. Resistivity can be measured with a wireline tool or a logging while drilling (LWD) tool. Measuring resistivity with a galvanic (DC) resistivity device typically involves forming an electrical potential in the formation and measuring a voltage between voltage measuring electrodes of the device. In an induction measurement device, magnetic flux/magnetic field is induced in the formation by the current in the transmitter; which induces a measured voltage in a receiver of the tool spaced axially from the transmitter. However, during LWD operations, there is a desire to "look ahead" so as to avoid drilling across bed boundaries or faults, as well as any subterranean geological hazard.

SUMMARY OF THE INVENTION

Disclosed herein is an example of a method of interferometric processing for looking ahead of a tool to measure distance to a bed boundary, and resistivity of a formation beyond the bed boundary. In an example, a method of investigating a subterranean formation using interferometric processing includes providing a tool string in a borehole that intersects the subterranean formation, providing a first current at a first location in the tool string that has a frequency of up to about 50 kHz and that induces a magnetic field in the formation, and measuring a first voltage along a receiver antenna at a second location in the tool string that is induced by the magnetic field in the formation, measuring a second voltage along a receiver antenna that is induced by the magnetic field in the formation and that is at a third location in the tool string which is spaced a distance from the first location that exceeds a distance from the first location to an end of the tool string proximate a bottom of the borehole. The method further includes estimating voltages based on the measured first and second voltages and identifying a bed boundary that is spaced away from a bottom of the borehole where a difference in the estimated voltages exceeds a threshold value. The method can also estimate a distance to the bed boundary as well as the resistivity of the formation beyond the bed boundary. In an example, the first voltage is measured by a first receiver in the tool string and the second voltage is measured by a second receiver in the tool string. Alternatively, the first current has a frequency of up to about 20 kHz. The second and third locations can be equidistantly spaced and on opposite sides of the first location. In this example, the distance from the second and third locations from the first location ranges up to around 50 feet. The tool string can further include a drill bit for forming the wellbore. In this example, the method can also include steering the drill bit in the formation based on the step of identifying the bed boundary.

Also provided herein is a method of investigating a subterranean formation that involves providing a tool string in a borehole that intersects the subterranean formation, providing a current in the tool string at a first location in the tool string and that has a frequency of up to about 50 kHz and that induces a current in the formation, and estimating one of a complex voltage with amplitude (magnitude) and the phase induced by the current in the formation at upper and lower locations in the tool string disposed on opposing sides of the first location and that are spaced apart from the first location at substantially the same distance. The method further includes identifying a bed boundary that is spaced away from a bottom of the borehole based on one of a difference (or a ratio of the voltage amplitudes) between voltage amplitudes estimated at the upper and lower locations, and a difference between phases estimated at the upper and lower locations. The upper and lower locations can be axially spaced from the first location at distances substantially equal to one another. In one example, the borehole has a deviated section. A bit can optionally be provided on a bottom of the tool string for forming the borehole. This example of the method further includes steering the bit based on the step of identifying the bed boundary. In one embodiment, voltage is measured at the lower location with a lower receiver and measuring voltage at the upper location with an upper receiver, and wherein when voltages measured by the upper and lower voltages begin to differ, a lower end of the tool string is spaced away from the bed boundary.

BRIEF DESCRIPTION OF DRAWINGS

Some of the features and benefits of the present invention having been stated, others will become apparent as the description proceeds when taken in conjunction with the accompanying drawings, in which:

FIGS. 7-11 are interferometric graphical examples of voltage responses measured using the LWD system of FIG.

2, with different resistivity ratios across bed boundaries in accordance with the present invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
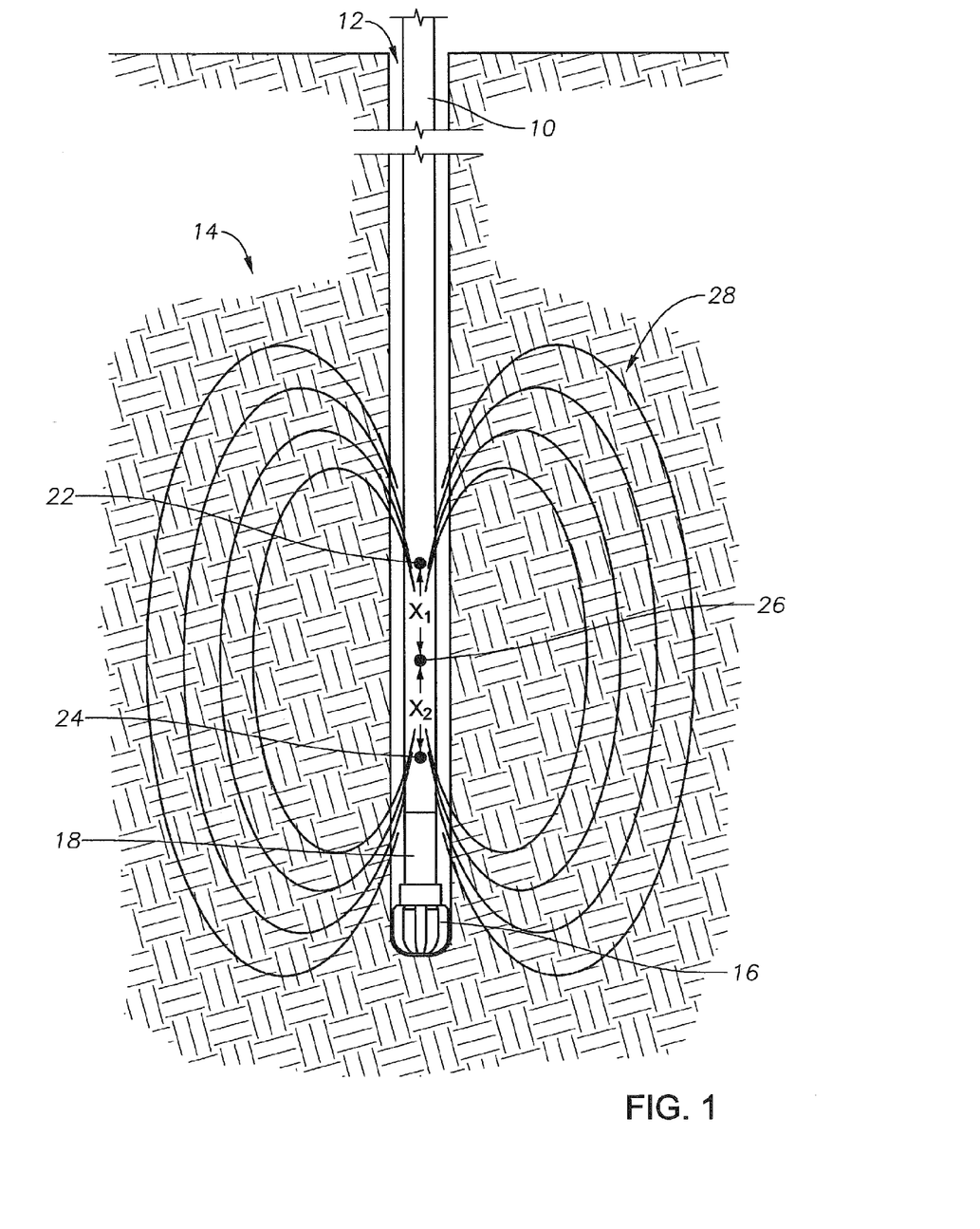
FIG. 1 is a side partial sectional view of an example embodiment of a logging while drilling (LWD) system on a drill string forming a borehole and in accordance with the present invention.

Shown in a partial side sectional view in FIG. 1 illustrates one example of a tool string or drill string 10 shown forming a borehole 12 through a subterranean formation 14. In the example, a drill bit 16 is provided on a lower end of the drill string 10. An optional mud motor 18 is included in the drill string 10 and above the bit 16. Further provided on the example of the drill string 10 of FIG. 1 are receivers 22, 24 for receiving electromagnetic signals induced in the formation 14. The receivers 22, 24 are spaced axially apart on the drill string 10 and on opposite sides of a transmitter 26. In an example, receiver 22 is spaced a distance $X_1$ upward from transmitter 26 and receiver 24 is spaced a distance $X_2$ downward from transmitter 26. Examples exist were $X_1$ is substantially equal to $X_2$. The transmitter 26 of FIG. 1 includes a coil or coils (not shown); that when an electrical current is provided that flows through the coil(s), a magnetic field is induced in the formation 14. In the example of FIG. 1, flux lines 28 are illustrated in the formation 14 that represent the magnetic field induced in the formation 14 by transmitter 26.

The receivers 22, 24 can sense the current in the formation 14, e.g. the flux lines 28. In an example, similar to the transmitter 26, the receivers 22, 24 include a coil or coils (not shown) in which a voltage is induced in response to the magnetic field in the formation 14. Measuring the voltage induced along the coils of receivers 22, 24 can yield information about the formation. An interferometric comparison, which can involve comparing measurements taken by receivers 22, 24, is one example of a processing technique for assessing the formation 14. In an embodiment, an interferometric comparison includes obtaining a difference of measurements taken by receivers 22, 24, and in another embodiment can be a natural log of a quotient of measurements taken by receivers 22, 24. In an example when the receivers 22, 24 are equidistant from the transmitter 26, and the resistivity of the formation 14 intersected by the flux lines 28 is substantially homogeneous and distal from a bed boundary, an interferometric comparison will yield a value close or equal to zero.

Figure 2A:
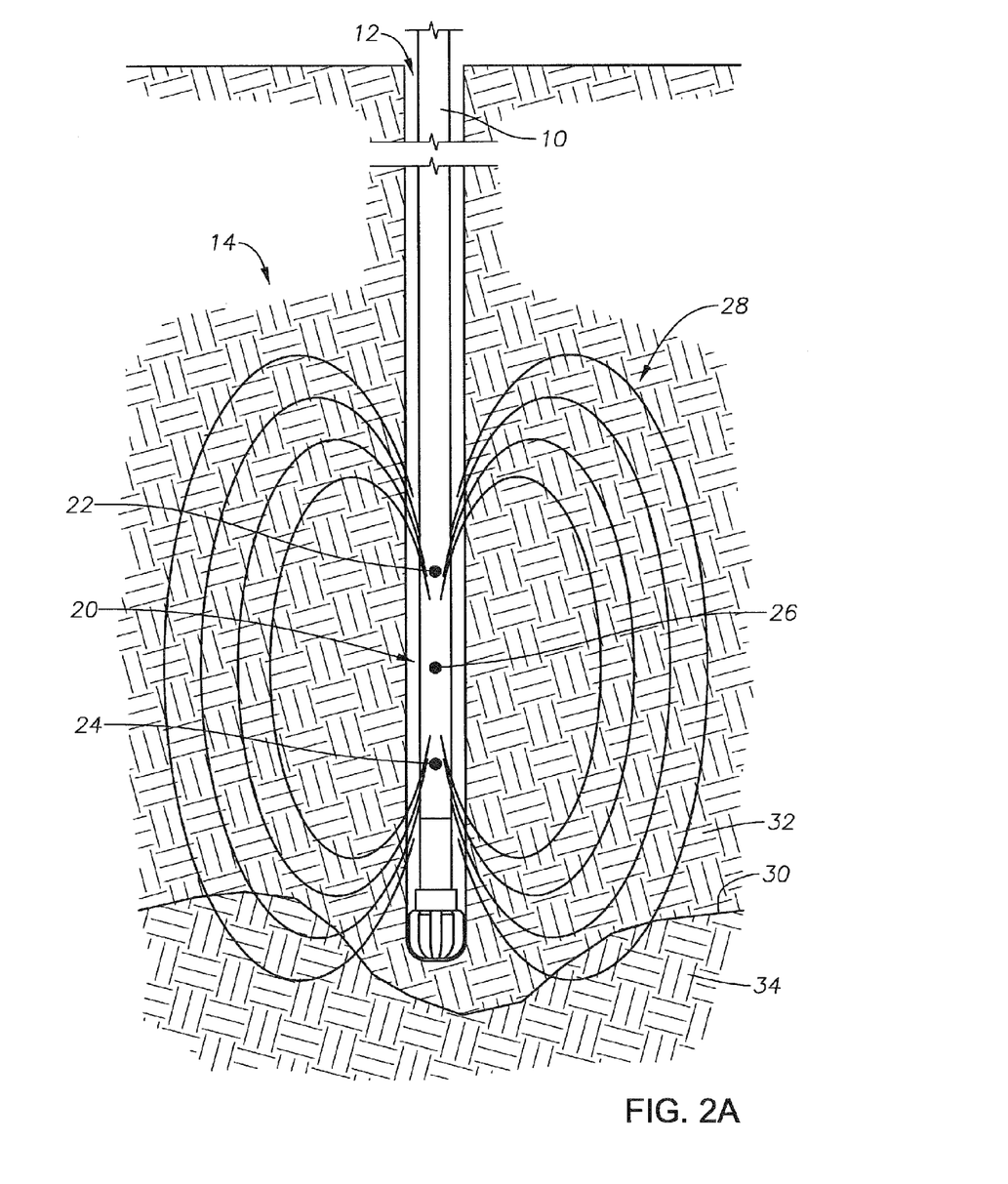
FIG. 2A is a side partial sectional view of an example of the LWD system and drill string of FIG. 1 shown approaching a bed boundary in accordance with the present invention.
Figure 2B:
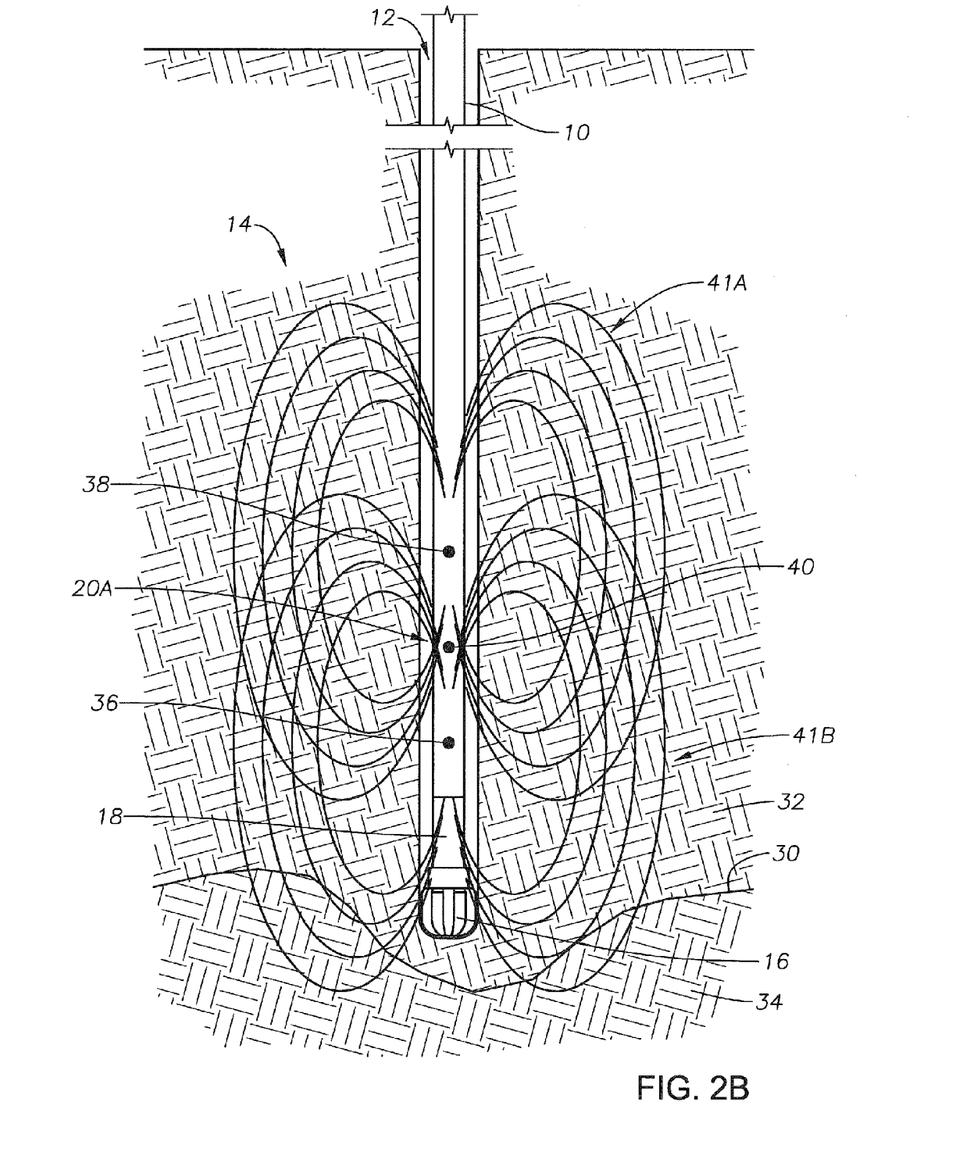
FIG. 2B is a side partial sectional view of an example of an embodiment of LWD system and drill string shown approaching a bed boundary in accordance with the present invention.

Referring now to FIG. 2A, a lower end of the borehole 12 is shown proximate a bed boundary 30 in the formation 14. As indicated above, the bed boundary 30 can be defined along changes in the physical characteristics of the formation 14, such as a change in the amount or type of fluid content. Thus in the example of FIG. 2A, a layer 32 in the formation 14 on one side of the bed boundary 30 can have physical characteristics that are measurably different from a layer 34 of the formation 14 on an opposing side of the bed boundary 30. As is known, the type and amount of fluid content in a formation can affect its resistivity. Further illustrated in FIG. 2A, is that the flux lines 28 emitted from the drill string 10 intersect with the bed boundary 30, meaning some of the flux lines 28 intersect with the layers 32, 34 on both sides of the bed boundary 30. In this example, an inteferometric comparison of signals measured by the receivers 22, 24 can yield a finite value. Moreover, the nature of the flux lines 28 generated in the formation 14 are such that the presence of the bed boundary 30 can be identified before the drill string 10 contacts the bed boundary 30. Depending on the circumstances, the drilling operator can cease drilling upon identification of the bed boundary 30. Optionally, the operator can steer the drill string 10 so the borehole 12 does not intersect the bed boundary 30. It should be pointed out that the interferometric comparison discussed herein can be used in boreholes that are vertical, horizontal, or otherwise deviated. FIG. 2B an alternate embodiment of a downhole tool 20A is shown having a pair of transmitters 36, 38 and a single receiver 40. In this example, transmitter 36 is disposed at a portion of the tool 20A proximate the mud motor 18 or bit 16, and transmitter 38 is on tool 20A and distal from mud motor 18 and bit 16. In an example, receiver 40 is on tool 20A at or about a midpoint between transmitters 36, 38. In the example of FIG. 2B, transmitter 36 includes a coil or coils that when energized with a current flow induces a magnetic field in the formation 14 represented by flux lines 41A. Similarly, a current flow through coil or coils in transmitter 38 induces a magnetic field in formation 14 represented by flux lines 41B. Flux lines 41A, 41B in turn induces voltage in a coil or coils in receiver 40 that generates a measurable voltage along the coil(s). In an alternative, embodiments of the tool 20 of FIG. 2A exist having a single one of the receivers 22, 24. Optionally, embodiments exist of the tool 20A of FIG. 2B having a single one of the transmitters 36, 38. In these optional embodiments, voltage measurements in the coil(s) of receivers 22, 24, 40 can be taken at first and second depths, and differences of the measured voltages can then be interferometrically processed to estimate distance from the tool 20, 20A to a bed boundary.

Figure 3A:
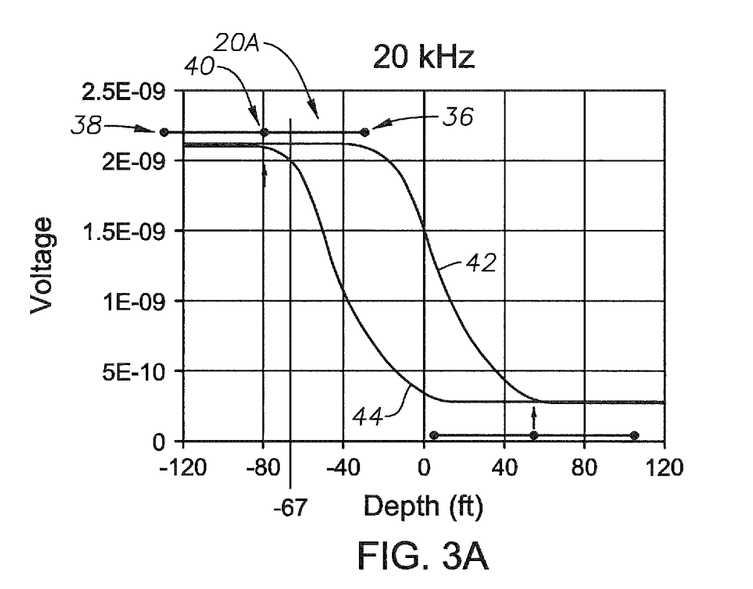
FIGS. 3A and 3B are interferometric graphical examples of a voltage response measured in a borehole with the LWD system of FIG. 2 in accordance with the present invention.

FIG. 3A graphically represents an example of an interferometric processing of voltages measured by an alternate embodiment of an imaging tool 20A. In the example of FIG. 3A, a schematic example of alternate imaging tool 20A is shown that includes transmitters 36, 38 respectively on its lower and upper ends and receiver 40 between transmitters 36, 38. For the purposes of discussion herein, transmitter 36 can be referred to as a lower transmitter and transmitter 38 as an upper transmitter. In one example, the receiver 40 is disposed at substantially a midpoint between the transmitters 36, 38 so that the tool 20A is symmetrical. The abscissa of the graph of FIG. 3A represents distance in feet from receiver 40 to a bed boundary, and the ordinate represents a measured/induced voltage at the receiver 40 when the transmitters 36, 38 are respectively fired. The negative values on the ordinate represent a distance above or before the bed boundary, whereas the positive values reflect a distance below or past the bed boundary. In an example, the bed boundary defines a change of resistivity in the formation from about 10 Ohm-m to about 1 Ohm-m. Curves 42, 44 represent voltage responses respectively from the transmitters 36, 38.

Figure 3B:
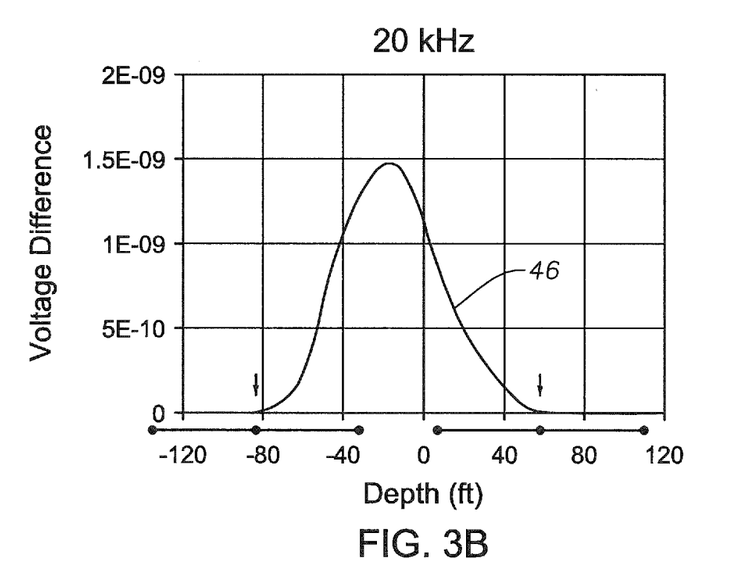

FIG. 3B also has an abscissa representing distance in feet from the bed boundary, and an ordinate that represents a voltage response. A difference is that FIG. 3B illustrates a single curve 46 which represents the difference between curves 42, 44, and thus depicts a difference in the voltage responses of the transmitters 36, 38.

Figure 4A:
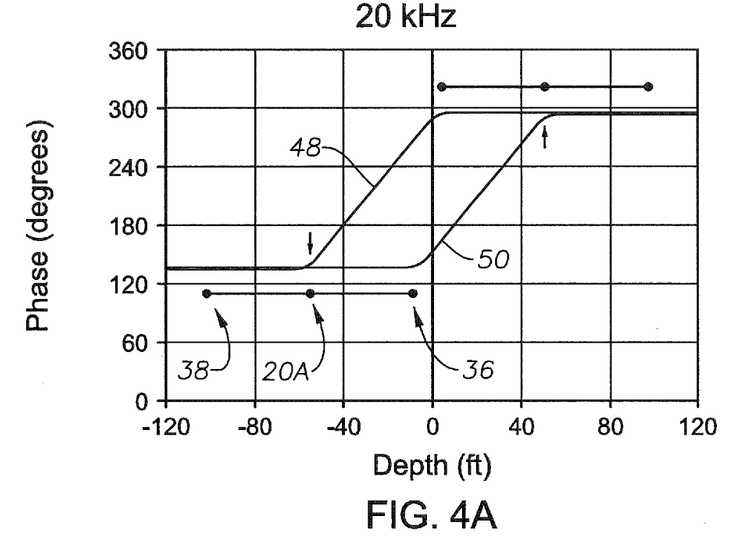
FIGS. 4A and 4B are interferometric graphical examples of a phase response measured in a borehole with the LWD system of FIG. 2 in accordance with the present invention.
Figure 4B:
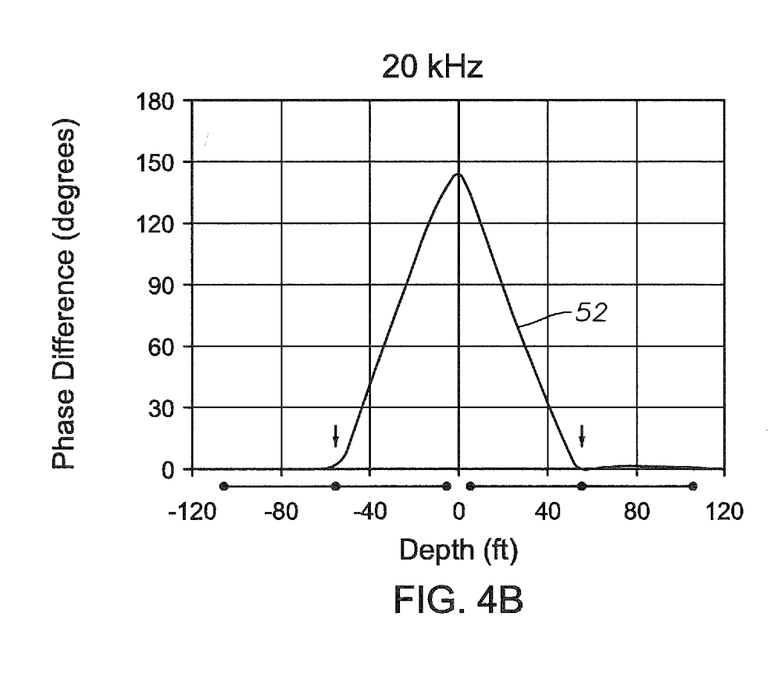

Referring now to FIGS. 4A and 4B, graphical representations of phase responses are provided for the transmitters 36, 38 of the tool 20A. Each of FIGS. 4A and 4B have an abscissa representing distance in feet from the bed boundary to receiver 40, and an ordinate representing the phase of the induced signal at receiver 40. FIG. 4A includes curves 48, 50 that respectively represent phase responses from transmitters 36, 38. Similar to FIG. 3B, FIG. 4B provides a single curve 52 that illustrates differences in phase responses with respect to depth in the borehole in which the tool 20A is disposed. Accordingly, as with the interferometric processing of recorded voltage response data depicted in FIGS. 3A and 3B, interferometric processing of recorded phase response data can indicate the presence of a bed boundary in a formation and in the path of the oncoming drill string well before the drill string encounters the bed boundary. The forward looking information thus allows evasive or corrective action on the part of the drill string operator.

In the example of FIGS. 3A and 3B and FIGS. 4A and 4B, the distance between the transmitters 36, 38 is at about 100 feet, thus putting the transmitters 36, 38 at an offset from the receiver 40 at around 50 feet. Also, the frequency of the signal generated in the tool 20A ranges up to and includes about 20 kHz. However, embodiments exist wherein the present method can be employed wherein the offset between the transmitters 36, 38 and receiver 40 is at about 40 feet, or can be up to around 100 feet, or in excess of hundreds of feet. Note that in the example graphs, the delay in detected response of the transmitters 36, 38 is substantially the same as the offset from the receiver 40. Optional embodiments exist wherein the present method can be employed wherein the frequency of the signal generated in the tool 20A ranges up to and includes about 50 kHz. From FIG. 3A the magnitude of curve 44, which represents the voltage response of the lower transmitter 36, begins to decrease starting at about 75 feet from the bed boundary. Thus the boundary may be detected when the lower transmitter 36 is about 25 feet in front of the bed boundary at the interface of adjacent formations having different values of resistivity. The voltage difference is discernible in FIG. 3B, where the bed boundary can be detected when the receiver 40 is 80 feet from the bed boundary, or when the lower transmitter 36 is about 30 feet from the bed boundary. Further evident in FIGS. 3A and 3B is how the detecting distance is significantly shorter by more than 10 feet in the conductive 1 Ohm-m layer in this example. Yet further illustrated in FIGS. 3B and 4B, is how a slope of the phase response of curve 52 is much steeper than the slope or curve of the voltage response of curve 46.

Figure 5A:
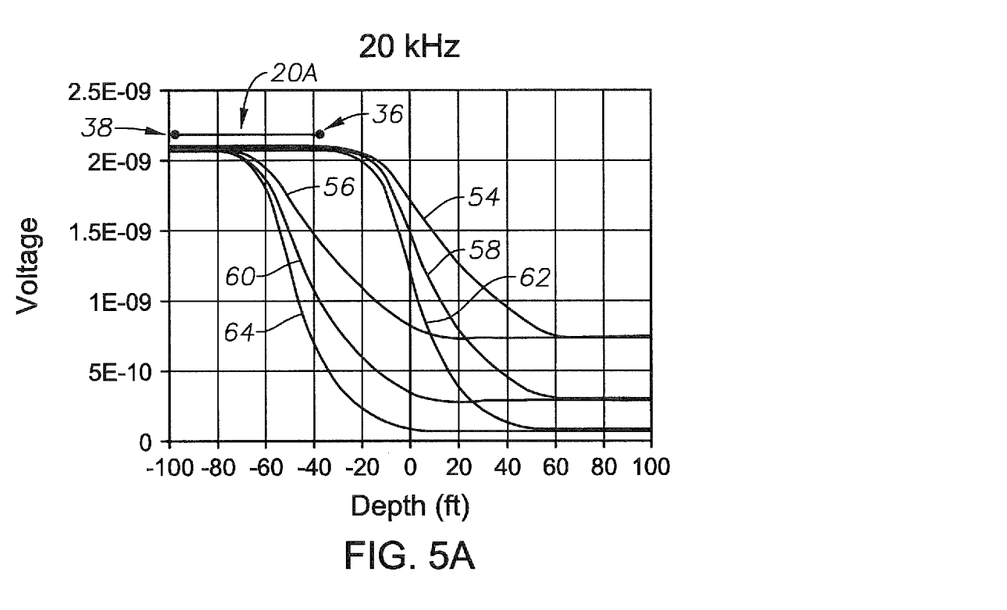
FIGS. 5A and 5B are interferometric graphical examples of voltage responses measured using the LWD system of FIG. 2, with different resistivity ratios across bed boundaries in accordance with the present invention.
Figure 5B:
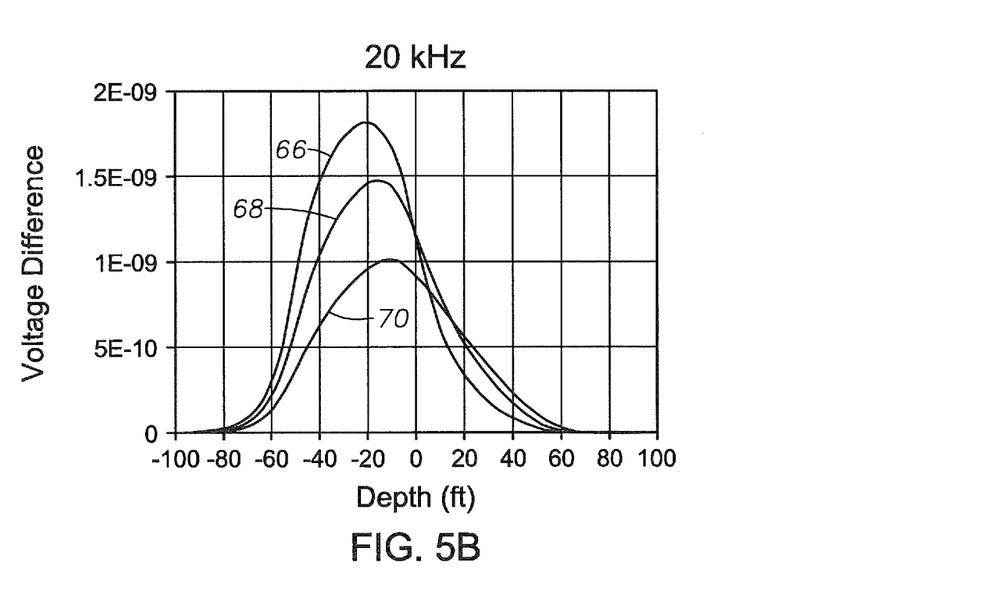

FIGS. 5A and 5B are graphical examples of voltage responses at the transmitters 36, 38 for multiple changes in formation resistivity along a boundary bed, where the abscissa for these graphs has units in feet and the ordinate has units in voltage. More specifically, curves 54, 58, and 62 represent a voltage response at the forward or lower transmitter 36, and curves 56, 60, and 64 represent a voltage response at the rear or upper transmitter 38. Curves 54 and 56 represent voltage responses recorded where a resistivity above the boundary layer is at about 10 Ohm-m and resistivity below the boundary layer is at about 2 Ohm-m. Curves 58 and 60 represent voltage responses recorded where a resistivity above the boundary layer is at about 10 Ohm-m and resistivity below the boundary layer is at about 1 Ohm-m. Curves 62 and 64 represent voltage responses recorded where a resistivity above the boundary layer is at about 10 Ohm-m and resistivity below the boundary layer is at about 0.5 Ohm-m. As with FIGS. 3A-4B above, the bed boundary is represented at a value of 0 on the abscissa. Further in the example of FIGS. 5A and 5B, the frequency of the signal generated in the tool 20A is about 20 kHz.

Figure 6A:
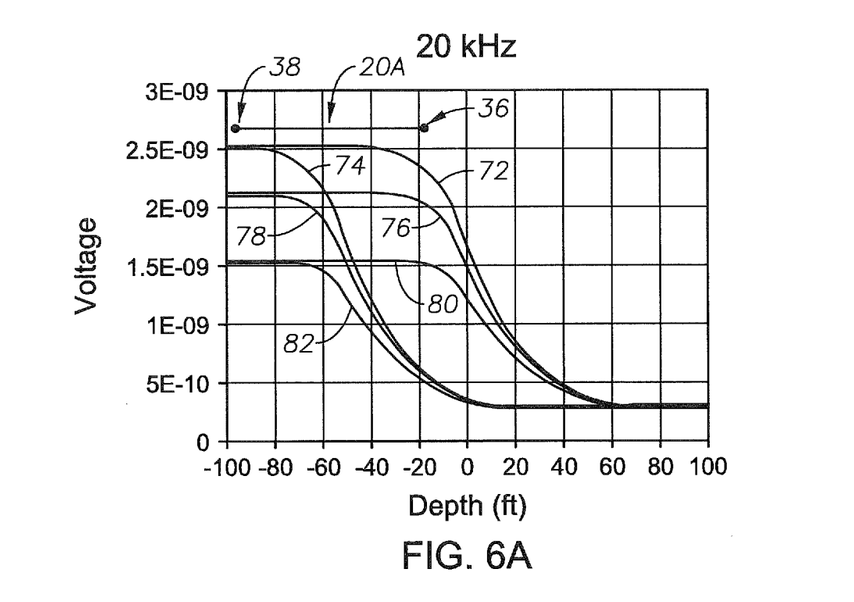
FIGS. 6A and 6B are interferometric graphical examples of voltage responses measured using the LWD system of FIG. 2, with different resistivity ratios across bed boundaries in accordance with the present invention.
Figure 6B:
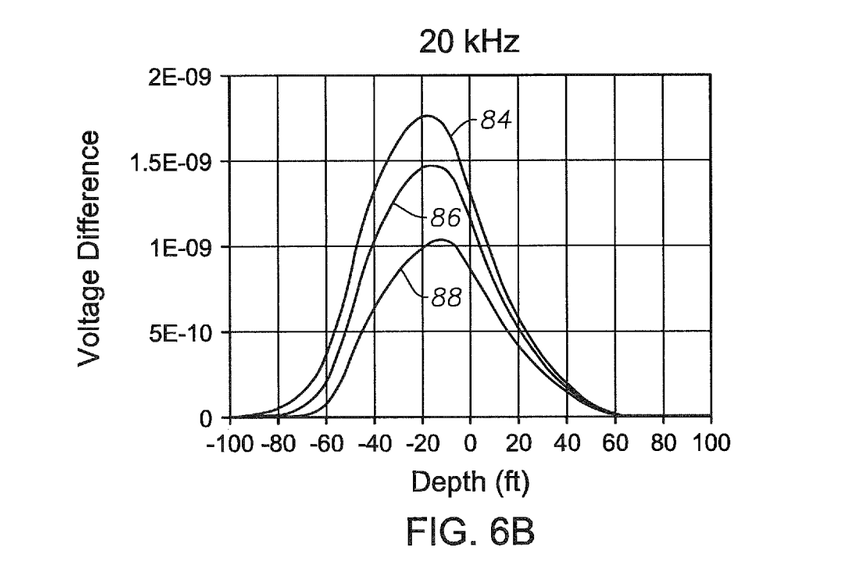

FIGS. 6A and 6B include graphical examples of voltage responses that are similar to those represented in FIGS. 5A and 5B. One difference between the responses is that the formation resistivities in FIGS. 6A and 6B are different from those represented in FIGS. 5A and 5B. Specifically referring to FIG. 6A, curves 72, 76, and 80 represent a voltage response at the forward or lower transmitter 36, and curves 74, 78, and 82 represent a voltage response at the rear or upper transmitter 38. Curves 72 and 74 represent voltage responses recorded where a resistivity above the boundary layer is at about 20 Ohm-m and resistivity below the boundary layer is at about 1 Ohm-m. Curves 76 and 78 represent voltage responses recorded where a resistivity above the boundary layer is at about 10 Ohm-m and resistivity below the boundary layer is at about 1 Ohm-m. Curves 80 and 82 represent voltage responses recorded where a resistivity above the boundary layer is at about 5 Ohm-m and resistivity below the boundary layer is at about 1 Ohm-m. The examples of FIGS. 5A and 6A indicate that magnitudes of differences in voltage responses between the transmitters 36, 38 increase with larger resistivity contrasts across the bed boundary. Moreover, as depicted in the example of FIG. 6A, the bed boundary can be detected at a greater distance when resistivity ratios are greater. Similar to the examples of FIGS. 5A and 5B, the frequency of the signal generated in the tool 20A is about 20 kHz.

Figure 7:
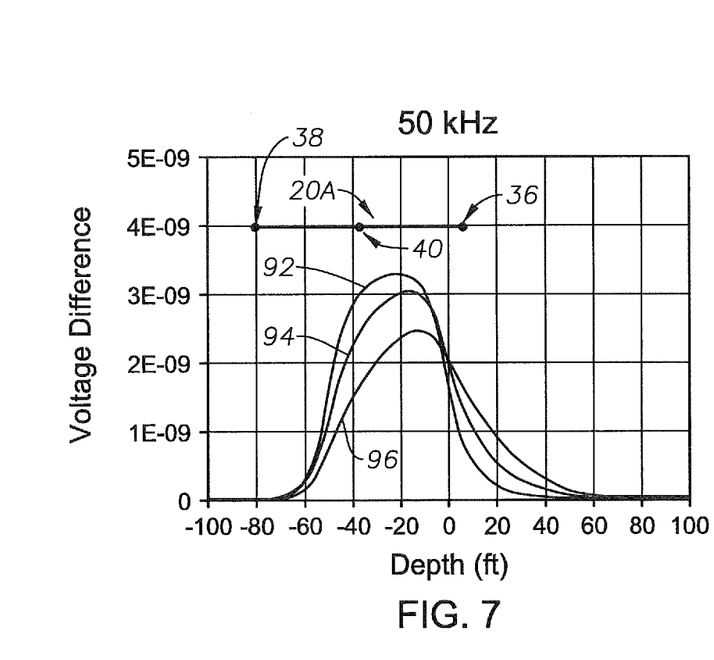
Figure 8:
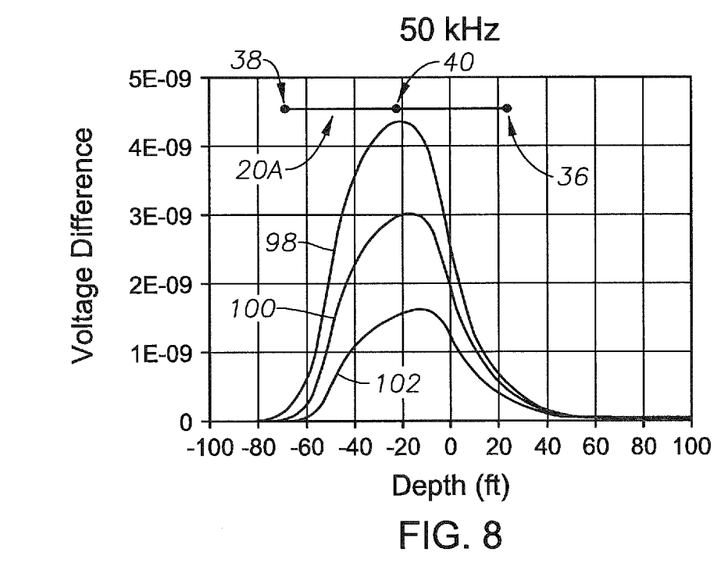

In FIGS. 7-10, curves are provided graphically illustrate examples of differences in voltage responses (also referred to herein optionally as attenuation) between the lower transmitter 36 and upper transmitter 38 on the tool 20A. Referring to FIG. 7, curves 92, 94, 96 represent differences in voltage responses of the transmitters 36, 38 where the resistivity ratios across the boundary layer are 10:0.5, 10:1, and 10:2 respectively. In FIG. 7, the formation above the boundary bed is 10 Ohm-m. Curves 98, 100, 102 of FIG. 8 represent differences in voltage responses of the transmitters 36, 38 where the resistivity ratios across the boundary layer are 20:1, 10:1, and 5:1 respectively. In FIG. 8, the formation below the boundary bed is 1 Ohm-m. The frequency of the signal generated in the tool 20A of FIGS. 7 and 8 is about 50 kHz and the distance between the receiver 40 and transmitters 36, 38 is about 50 feet.

Figure 9:
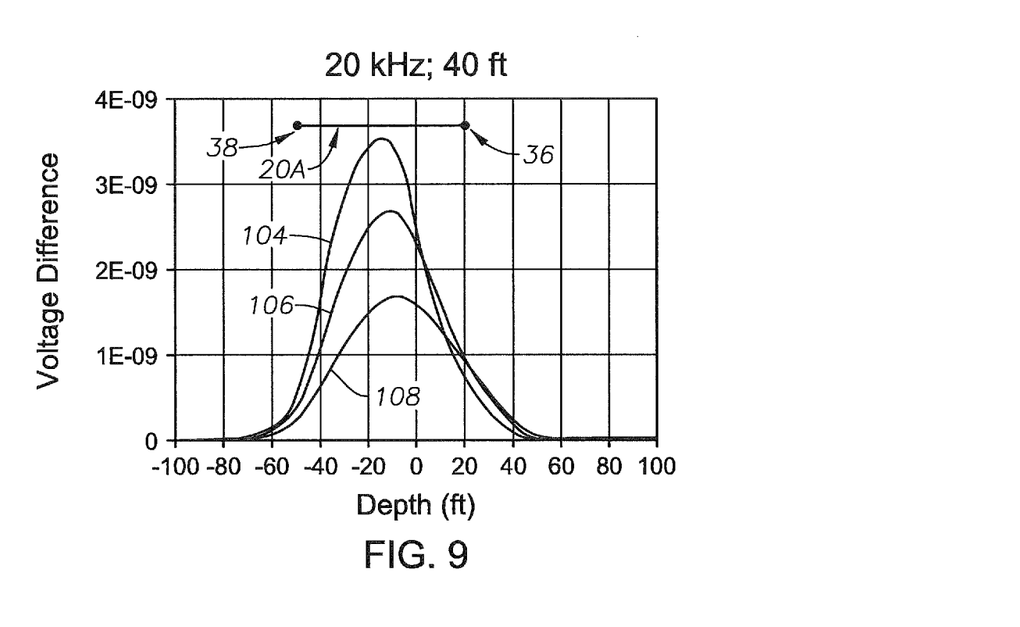
Figure 10:
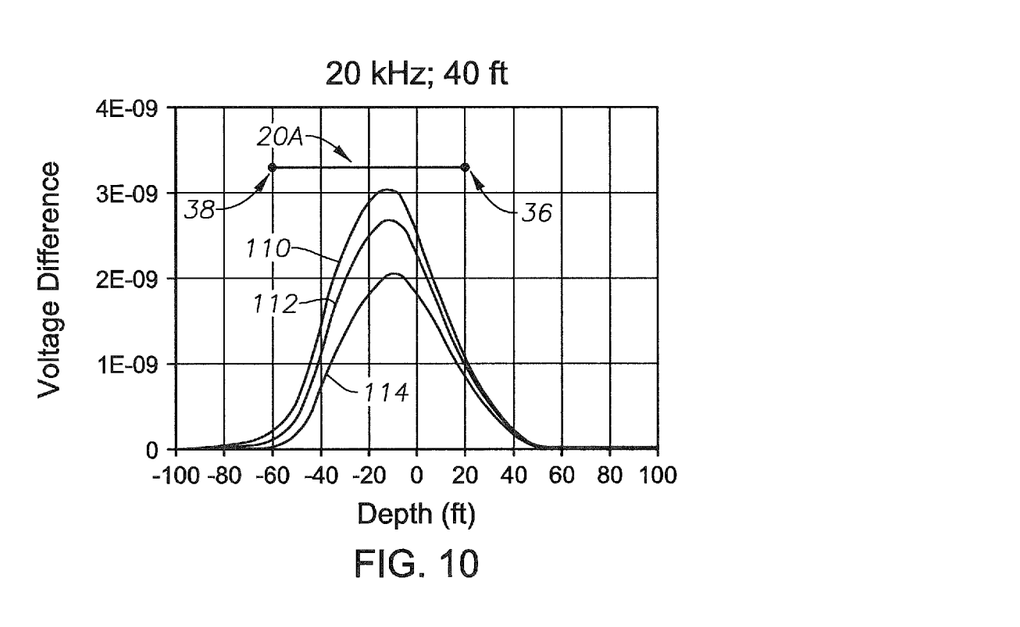
Figure 11:
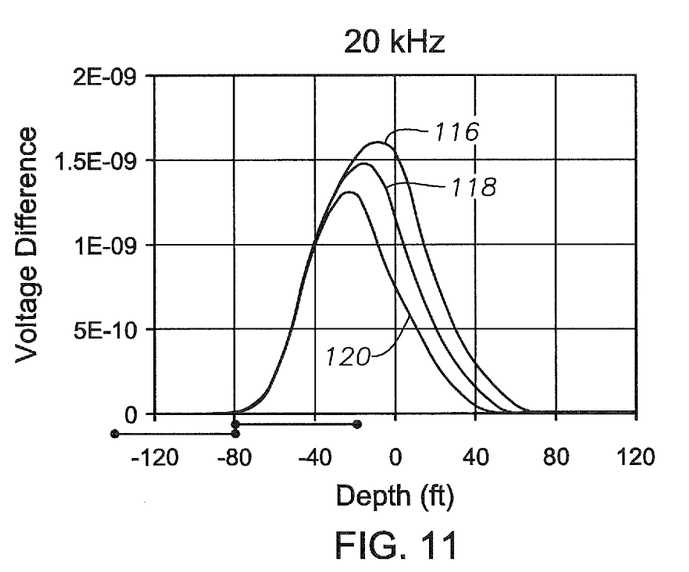

FIGS. 9 and 10 show differences in voltage response of transmitters 36, 38, where the frequency is at about 20 kHz and the offset between the receiver 40 and transmitters 36, 38 is about 40 feet. Specifically with regard to FIG. 9, curves 104, 106, 108 represent differences in voltage responses of the transmitters 36, 38 where the resistivity ratios across the boundary layer are 10:0.5, 10:1, and 10:2 respectively. In FIG. 10, curves 110, 112, 114 represent differences in voltage responses of the transmitters 36, 38 where the resistivity ratios across the boundary layer are 20:1, 10:1, and 5:1 respectively.

Figure 12:
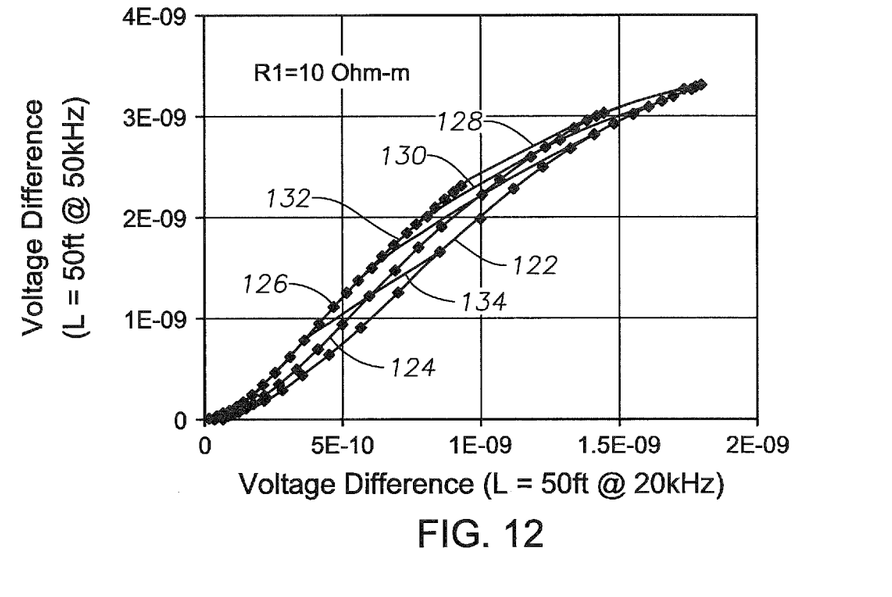
FIGS. 12 and 13 are nomograms that provide graphical examples of correlating voltage responses measured using different tool parameters and in accordance with the present invention.
Figure 13:
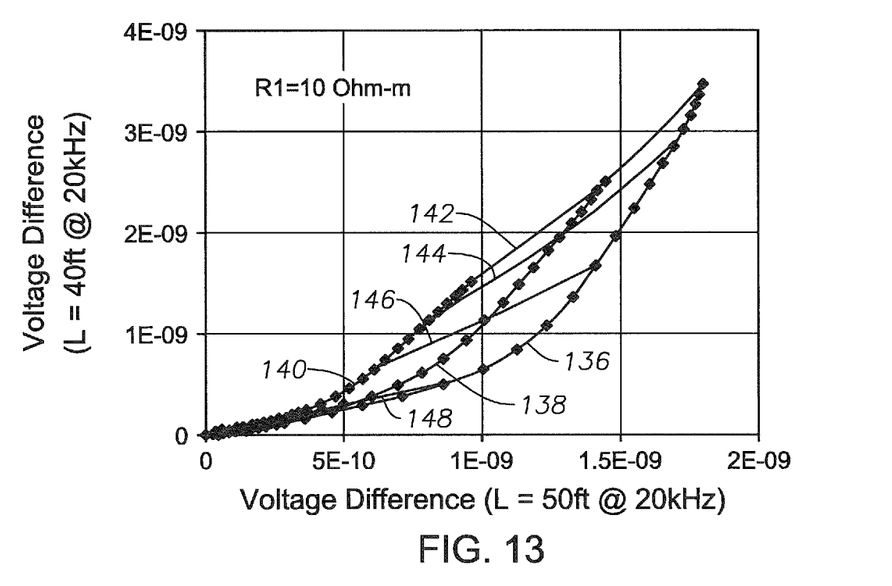

FIGS. 12 and 13 include nomograms with curves generated from values of correlated measured voltage differences of some of the above described figures. More specifically, curve 122 of FIG. 12 represents corresponding voltages differences of curve 66 of FIG. 5B (on the abscissa) and curve 92 of FIG. 7 (on the ordinate), The corresponding abscissa and ordinate values for generating curve 122 are taken from the same depth. In an example, from FIG. 5B at about a distance of 20 feet above the bed boundary, curve 66 has a corresponding voltage of about 1.8E-9 volts; curve 92 of FIG. 7 has a corresponding voltage of about 3.2E-9 volts at distance of 20 feet above the bed boundary. As shown in FIG. 12, curve 122 passes through point 1.8E-9, 3.2E-9. In similar fashion, curves 124, 126 represent corresponding voltage values for respectively for curves 68, 94 and curves 70, 96. Knowing the distances from the bed boundary that correspond to the voltage values of curves 122, 124, 126, lines 128, 130, 132, 134 can be generated on the nomogram, where in the example of FIG. 12, lines 128, 130, 132, 134 respectively represent corresponding voltage differences at 20, 30, 40, and 50 feet from the bed boundary. As noted above, voltage differences plotted in FIG. 5B, and on the abscissa of FIG. 12, represent voltage values measured by a tool having an offset of 50 feet and generating signals of 20 kHz; voltage differences provided on the ordinate of FIG. 12, represent voltage values measured by a tool having an offset of 50 feet and generating signals of 50 kHz. FIG. 13, a nomogram like FIG. 12, is a plot that combines the voltage differences of FIG. 5B and FIG. 9. Curve 136 represents corresponding voltage values of curve 66 and curve 104, curve 138 represents corresponding voltage values of curve 68 and 106, and curve 140 represents corresponding voltage values of curve 70 and 108, Lines 142, 144, 146, 148 respectively represent corresponding voltage differences at 20, 30, 40, and 50 feet from the bed boundary. Voltage differences on the abscissa of FIG. 13 represent voltage values measured by a tool having an offset of 50 feet and generating signals of 20 kHz; voltage differences provided on the ordinate of FIG. 13 represent voltage values measured by a tool having an offset of 40 feet and generating signals of 20 kHz. Thus by changing a tool parameter, a nomogram can be generated and used to look past the boundary and estimate formation properties, such as resistivity, under or on an opposite side of the bed boundary. In an example, the nomograms of FIGS. 12 and 13 were generated from simultaneously solving equations having more than a single unknown.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of investigating a subterranean formation comprising:
   (a) providing a tool string in a borehole that intersects the subterranean formation;
   (b) providing a first current at a first location in the tool string that has a frequency of up to about 50 kHz and that induces a magnetic field in the formation;
   (c) measuring a first induced voltage at a second location in the tool string that is induced by the magnetic field in the formation;
   (d) measuring a second induced voltage that is induced by the magnetic field in the formation and that is at a third location in the tool string which is spaced a distance from the first location that exceeds a distance from the first location to an end of the tool string proximate a bottom of the borehole;
   (e) interferometrically comparing the measured first induced voltage with the second induced voltage to define an interferometric comparison; and
   (f) identifying a bed boundary that is spaced away from a bottom of the borehole where a value of the interferometric comparison exceeds a threshold value.

2. The method of claim 1, wherein the first induced voltage is measured by a first receiver in the tool string and the second induced voltage is measured by a second receiver in the tool string, and wherein formations on opposing sides of the bed boundary have different values of resistivity.

3. The method of claim 1, wherein the step of interferometrically comparing comprises obtaining a difference between the first induced voltage and the second induced voltage.

4. The method of claim 1, wherein the second and third locations are equidistantly spaced and on opposite sides of the first location.

5. The method of claim 4, wherein the distance of the second and third locations from the first location is at least around 20 feet.

6. The method of claim 1, wherein the tool string further comprises a drill bit for forming the wellbore, and the method further comprising steering the drill bit in the formation based on the step of identifying the bed boundary.

7. The method of claim 1, further comprising estimating information about the subterranean formation on a side of the bed boundary distal from the borehole based on steps (c)-(f).

8. The method of claim 1, further comprising estimating a distance from the tool to the bed boundary.

9. A method of investigating a subterranean formation comprising:
   (a) providing a tool string in a borehole that intersects the subterranean formation;
   (b) providing a current in the tool string at a first location in the tool string and that has a frequency of up to about 50 kHz and that induces a magnetic field in the formation;
   (c) calculating one of a voltage and a phase induced by the magnetic field in the formation at upper and lower locations in the tool string disposed on opposing sides of the first location and that are spaced apart from the first location at substantially the same distance; and
   (d) identifying a bed boundary that is spaced away from a bottom of the borehole based on: interferometrically comparing a voltage estimated at the upper location with a voltage estimated at the lower location, and interferometrically comparing a phase estimated at the upper location with a phase estimated at the lower location.

10. The method of claim 9, wherein interferometrically comparing comprises obtaining a difference between the voltages or phases calculated at the upper and lower locations.

11. The method of claim 9, wherein the borehole comprises a deviated section.

12. The method of claim 9, wherein a bit is provided on a bottom of the tool string for forming the borehole.

13. The method of claim 12, further comprising steering the bit based on the step of identifying the bed boundary.

14. The method of claim 9 further comprising measuring voltage at the lower location with a lower receiver and measuring voltage at the upper location with an upper receiver, and wherein when voltages measured at the upper and lower locations begin to differ, a lower end of the tool string is spaced proximate to the bed boundary.

15. The method of claim 9, wherein the tool comprises a transmitter and a receiver, the method further comprising inducing voltages in the receiver at different depths, and wherein the bed boundary is identified by a comparison of the voltages induced in the receiver at different depths.

16. The method of claim 9, wherein a first frequency to induce a first one of the voltages is different from a second frequency to induce a second one of the voltages.

17. The method of claim 9, further comprising calculating information about the subterranean formation on a side of the bed boundary distal from the borehole based on steps (c)-(d).

18. The method of claim 1, wherein interferometrically comparing comprises estimating a natural log quotient of the measured voltages.

19. The method of claim 9, wherein interferometrically comparing comprises obtaining a natural log of a quotient of the voltages or phases calculated at the upper and lower locations.

* * * * *